United States Patent
Desai et al.

(10) Patent No.: US 6,521,706 B1
(45) Date of Patent: Feb. 18, 2003

(54) COMPOSITION OF EPOXY POLYMER, THERMOPLASTIC POLYMER, RUBBER PARTICLES AND CURING AGENT

(75) Inventors: Umesh C. Desai, Wexford, PA (US); Anthony C. Palermo, Gibsonia, PA (US)

(73) Assignee: PPG Industries ohio, Inc., Cleveland, OH (US)

( * ) Notice: Subject to any disclaimer, the term of this patent is extended or adjusted under 35 U.S.C. 154(b) by 266 days.

(21) Appl. No.: 09/226,903

(22) Filed: Jan. 8, 1999

Related U.S. Application Data
(60) Provisional application No. 60/071,212, filed on Jan. 12, 1998.

(51) Int. Cl.$^7$ .......................... C08L 63/00; C08L 63/02; C08L 63/04; C08L 96/08; C08L 17/00
(52) U.S. Cl. ...................... 525/111; 525/108; 525/113; 525/121; 525/122
(58) Field of Search ................................. 525/111, 108, 525/113, 122, 121

(56) References Cited

U.S. PATENT DOCUMENTS

| | | | |
|---|---|---|---|
| 3,113,036 A | 12/1963 | Schwarzer ................ 117/75 |
| 4,501,853 A | 2/1985 | Sugimori et al. ........... 525/122 |
| 4,739,019 A | 4/1988 | Schappert et al. .......... 525/438 |
| 5,169,710 A | * 12/1992 | Qureshi et al. ............. 523/457 |
| 5,266,610 A | * 11/1993 | Malhotra et al. ........... 525/523 |
| 5,368,240 A | 11/1994 | Bonnet ....................... 241/41 |
| 5,470,886 A | 11/1995 | Makhlouf et al. ............ 521/59 |
| 5,588,600 A | 12/1996 | Perfido et al. ............... 241/23 |

FOREIGN PATENT DOCUMENTS

| | | |
|---|---|---|
| DE | 3809003 | 9/1988 |
| EP | 0328046 | 8/1989 |
| GB | 2119390 | * 11/1983 |
| JP | 44-12278 | * 6/1969 .................. 525/111 |
| JP | 50158678 | 12/1975 |
| JP | 51088580 | 8/1976 |
| JP | 53-42223 | 4/1978 |
| JP | 59-78282 | * 5/1984 |
| JP | 60-26417 | 6/1985 |
| JP | 63-32472 | * 2/1988 |
| JP | 63-230780 | 9/1988 |
| JP | 2-105828 | 4/1990 |
| JP | 2227452 | 9/1990 |
| JP | 3-296587 | * 12/1991 |
| JP | 5-105854 | 4/1993 |
| JP | 07-118414 | 5/1995 |

OTHER PUBLICATIONS

RD 291022 abstract entitled "Addition of Rubber Containing Powders to Polyepoxy Adhesives" by Ciba Geigy AG, 1988.
Material Safely Data Sheet, EPS–200 Rubber–All Mixture of Natural and Synthetic Rubbers, Carbon Black, Filler and Oils, Santee River Rubber Co., LLC (Sep. 1997).
DD 283148 abstract, Oct. 1990.
Material Safety Data Sheet, Dec. 1997, by Santee River Rubber Company, LLC.

\* cited by examiner

*Primary Examiner*—Robert E.L. Sellers
(74) *Attorney, Agent, or Firm*—Deborah M. Altman; Ann Marie Cannoni

(57) ABSTRACT

The present invention provides curable coating compositions including: (a) about 55 to about 99 weight percent of an epoxy-functional polymer containing at least two epoxide groups per molecule; (b) about 1 to about 45 weight percent of a thermoplastic polymer effective to reduce shrinkage of the curable composition upon curing and which is substantially insoluble in the epoxy-functional polymer; (c) about 1 to about 70 weight percent of ground vulcanized rubber particles having an average particle size ranging from about 1 to about 300 microns; (d) a curing agent adapted to cure the epoxy-functional polymer; and, optionally, vinyl chloride polymer.

13 Claims, No Drawings

COMPOSITION OF EPOXY POLYMER, THERMOPLASTIC POLYMER, RUBBER PARTICLES AND CURING AGENT

CROSS REFERENCE TO RELATED PATENT APPLICATION

This patent application is related to U.S. Provisional Patent Application Serial No. 60/071,212, filed Jan. 12, 1998.

FIELD OF THE INVENTION

The present invention relates to epoxy resin-containing coating compositions suitable for use as adhesives, anti-flutter compositions and coatings e.g. for body panel reinforcement and sound dampening.

BACKGROUND OF THE INVENTION

Automobile manufacturers continue to seek improved adhesives to bond similar or dissimilar materials and/or substrates in the manufacturing of motor vehicles. Improvements in the adhesion, durability and strength of structural adhesives enable the production of motor vehicles with better fit of the adhesively bonded parts. As discussed in U.S. Pat. No. 4,739,019, adhesive compositions prepared from epoxy resins exhibit a number of advantages including good strength, adhesion, corrosion resistance and suitability for formulation at high solids levels. To reduce shrinkage, a thermoplastic polyester that is nonreactive with and insoluble in the epoxy resins and that has a weight average molecular weight of from about 1,000 to about 8,000 is included in the epoxy-based adhesive composition.

Also, improved adhesives could result in additional applications for adhesives in motor vehicles and translate into improvements of other curable epoxy-containing coating compositions that have components similar to that of the adhesives, such as corrosion protection coatings, reinforcement coatings, sound dampening and anti-flutter compositions. Such coatings are lightweight compared to metal to reduce the weight of motor vehicles.

Typically, protective coatings designed to inhibit corrosion are applied to the underbody of motor vehicles. The protective underbody coatings are applied to protect the underlying metal structures of the motor vehicle from corrosion by forming a barrier against water and road salt. To be effective and durable, this barrier needs to withstand impacts from abrasive materials such as sand, rock salt, stones and road debris.

Coatings for reinforcement are applied to the interior surfaces of metal parts of motor vehicles. Such reinforcement coatings require sufficient flexibility so that the coated metal does not dimple when the reinforcement coating is cured.

Underbody and underhood coatings also can be used to dampen or reduce road and engine noise, preventing it from permeating into the passenger compartment of the motor vehicle. Sprayable coatings are preferred to facilitate application. Such coating compositions must be adapted to avoid deterioration of the application equipment, e.g., by abrasion of nozzles, pumps and the like.

Anti-flutter compositions are commonly used to prevent vibrations of doors and deck lids. They are usually applied between reinforcing metal bars and the body panel. By varying the components and amounts of components, these compositions can provide different degrees of expansion and strength from the very soft to the very hard.

For a coating and composition manufacturer making more than one of the aforementioned types of coatings and compositions, it is desirable from a manufacturing standpoint to consolidate the similar types of components that may be present in more than one coating or composition to obtain a platform-type of composition from which numerous types of coatings and compositions can be made. For example, if a combination of a thermosetting polymer and its curing agent provide improved properties in one type of coating, they may also provide similar improvements in another type of coating that may include other additional components.

Versatile curable coating compositions which provide corrosion protection and adhesion in various applications such as protective coatings, adhesives, sound dampening compositions, reinforcement compositions, and anti-fluttering compositions are desirable. Preferably, the curable coating compositions provide a base from which other compositions and coatings can be prepared.

SUMMARY OF THE INVENTION

In accordance with the present invention, there is provided a curable coating composition comprising: (a) at least one epoxy-functional polymer containing at least two epoxide groups per molecule present in an amount ranging from about 55 to about 99 weight percent of total resin solids of the coating composition; (b) at least one thermoplastic polymer which is substantially insoluble in the epoxy-functional polymer present in an amount ranging from about 1 to about 45 weight percent of total resin solids of the coating composition; (c) ground vulcanized rubber particles having an average particle size ranging from about 1 to about 300 microns present in an amount ranging from about 1 to about 70 weight percent of total resin solids of the coating composition; and (d) a curing agent adapted to cure the epoxy-functional polymer.

Another aspect of the present invention is a curable coating composition comprising: (a) at least one epoxy-functional polymer containing at least two epoxide groups per molecule present in an amount ranging from about 40 to about 98.9 weight percent of total resin solids of the coating composition; (b) at least one thermoplastic polymer which is substantially insoluble in the epoxy-functional polymer present in an amount ranging from about 1 to about 59 weight percent of total resin solids of the coating composition; (c) at least one vinyl chloride polymer present in an amount ranging from about 0.1 to about 59 weight percent of total resin solids of the coating composition; (d) ground vulcanized rubber particles having an average particle size ranging from about 1 to about 300 microns present in an amount ranging from about 1 to about 70 weight percent of total resin solids of the coating composition; and (e) a curing agent adapted to cure the epoxy-functional polymer.

Yet another aspect of the present invention is a curable coating composition comprising: (a) at least one monoepoxide polymer present in an amount ranging from about 0.1 to about 5 weight percent of total resin solids of the coating composition; (b) at least one thermoplastic polymer present in an amount ranging from about 1 to about 59 weight percent of total resin solids of the coating composition; (c) at least one vinyl chloride polymer present in an amount ranging from about 0.1 to about 59 weight percent of total resin solids of the coating composition; and (d) ground vulcanized rubber particles having an average particle size ranging from about 1 to about 300 microns present in an amount ranging from about 1 to about 70 weight percent of total resin solids of the coating composition.

DETAILED DESCRIPTION OF THE PREFERRED EMBODIMENTS

Generally, the curable coating compositions of the present invention comprise the four principal components (a), (b), (c), and (d) discussed above. Other additional components can be included in the composition depending on its intended application. The relative amounts of the components (a), (b), (c) and (d) in the coating composition also depend in part upon the intended application of the composition, such as protective coatings, sound dampening, adhesion or anti-flutter compositions, and will be discussed in detail below.

As used herein, unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Also for molecular weights, whether $M_n$ or $M_w$, these quantities are determined by gel permeation chromatography using polystyrene as standards as is well known to those skilled in the art and such as is discussed in U.S. Pat. No. 4,739,019 at column 4, lines 2–45, which incorporated herein by reference in its entirety. The term "equivalent weight" is a calculated value based on the relative amounts of the various ingredients used in making the specified material and is based on the solids of the specified material. The relative amounts are those that result in the theoretical weight in grams per mole of the material like a polymer produced from the ingredients and give a theoretical number of a particular functional group that is present in the resulting polymer. The theoretical polymer weight is divided by the theoretical number to give the equivalent weight. For example, epoxy equivalent weight is based on the equivalents of reactive pendant and/or terminal epoxy groups divided into the molecular weight of the epoxy-functional polymer.

In a preferred embodiment, the curable coating composition of the present invention comprises one or more epoxy-functional polymers, each polymer having at least two epoxide or oxirane groups per molecule. As used herein, "epoxy-functional polymers" means epoxy-functional oligomers (preferred), polymers and/or copolymers. These materials often are referred to as di- or polyepoxides. Generally, the epoxide equivalent weight of the epoxy-functional polymer can range from about 70 to about 4,000, and preferably about 140 to about 600, as measured by titration with perchloric acid and quaternary ammonium bromide using methyl violet as an indicator.

Suitable epoxy-functional polymers can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials include polyepoxides comprised of epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Preferred polyepoxides include diglycidyl ethers of bisphenol A, such as EPON® 828 epoxy resin which is commercially available from Shell Chemical Company. EPON® 828 epoxy resin has a number average molecular weight of about 400 and an epoxy equivalent weight of about 185–192. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers. These polyepoxides are well known to those skilled in the art and are described in U.S. Pat. No. 4,739,019 at column 2, line 6 through column 3, line 12.

The amount of the epoxy-functional polymer in the curable coating composition can vary depending in part upon the intended application of the composition. In a preferred embodiment, the epoxy-functional polymer is present in an amount ranging from about 55 to about 99 weight percent of the total resin solids of the curable coating composition, preferably about 60 to about 95 weight percent, and more preferably about 65 to about 85 weight percent. In an alternative preferred embodiment in which one or more vinyl chloride polymers are present, the epoxy-functional polymer is present in an amount ranging from about 40 to about 98.9 weight percent of the total resin solids of the curable coating composition. In another alternative embodiment in which one or more vinyl chloride polymers are present, about 0.1 to about 5 weight percent of a monoepoxide can be included in the coating composition. Preferably, one or more di- or polyepoxides are present in combination with the monoepoxide in this alternative embodiment in an amount ranging from about 20 to about 98.8 weight percent on a total resin solids basis.

Preferably, the polyepoxides are present as liquids or dispersions, lo although combinations of liquid and solid epoxy-functional polymers can be used as long as the desired viscosity of the curable coating composition is obtained from the other components of the composition.

The curable coating composition also comprises one or more essentially thermoplastic polymers to retard shrinkage at the time of curing. As used herein, "essentially thermoplastic" means that the thermoplastic polymer can contain some percentage of unsaturated units so long as the thermoplastic nature of the polymer is maintained, i.e., it does not react with the other components of the curable composition but rather is present as a blended ingredient. In one preferred embodiment the saturated polyester type of thermoplastic polymer contains no more than about 10 percent by weight of unsaturated units, the percentage being based on the total weight of all of the ingredients of the polyester.

Also, the essentially thermoplastic polymer is preferably substantially insoluble in the epoxy-functional polymer. As used herein, "substantially insoluble" means that the mixture of epoxy-functional polymer and effectively thermoplastic polymer forms a heterogeneous phase that can be hazy. Such thermoplastic polymers usually have a glass transition temperature of less than about 80° C. Non-limiting examples of suitable thermoplastic polymers include: polyvinyl acetate; aromatic vinyl polymers; vinyl copolymers having vinyl aromatic hydrocarbons as monomer components such as polystyrene, styrene-butadiene copolymers, styrene-divinylbenzene copolymers and styrene-acrylonitrile copolymers; saturated polyesters including saturated aliphatic polyesters such as polyneopentyl adipate, polypropylene adipate and poly epsilon-caprolactone; polyacrylates such as polyalkyl (meth)acrylates having alkyl groups with 1–8 carbon atoms, polymethacrylates or polyalkyl(meth)acrylates obtained by polymerization of methyl methacrylate, isobutyl methacrylate and 2-ethylhexyl acrylate; saturated polyester urethanes, and the like. Other useful thermoplastic polymers include polybutadienes, polybutadiene/acrylonitriles, polybutadiene/acrylonitrile, polybutadiene styrenes, polystyrene thermoplastic polymers having a $M_w$ of about 700 to about 150,000, polyvinyl chlorides, polyvinyl chloride/acetates, polyvinyl acetates having a $M_w$ of about 20,000 to about 200,000. Also included are saturated polyethers, optionally with a polyurethane chain extension as known to those skilled in the art having a molecular weight of about 700 to about 10,000.

When polyvinyl chloride polymers are present with the epoxy-functional polymer in the curable coating composition, the polyvinyl chloride polymers can function as the thermoplastic polymer. In this case additional amounts of the thermoplastic polymer would not be necessary.

In a preferred embodiment, the essentially thermoplastic polymer is non-reactive with the curable epoxy-functional polymer in the curable composition. Also, the thermoplastic polymer is substantially free of aromatic units. "Substantially free of aromatic units" means that the thermoplastic polymer contains no more than 10 percent by weight of aromatic units, the percentage being based upon the total weight of all of the ingredients of the thermoplastic polymer. As used herein, an aromatic unit is intended to mean a six carbon ring having pendant hydrogen atoms, the ring having pi electron orbitals above and below the plane of the ring structure, as in benzene.

Preferred thermoplastic polymers are substantially saturated polyesters that satisfy the aforedescribed requirements and are prepared from polyfunctional acids and polyhydric alcohols by methods such as are disclosed in U.S. Pat. No. 4,739,019 at column 3, line 22 through column 5, line 15. Examples of suitable saturated acids for preparing the preferred saturated polyesters include adipic acid, azelaic acid, sebacic acid and the anhydrides thereof where they exist. When some proportion of unsaturation is present, it is commonly introduced by the use of unsaturated polyfunctional acids such as maleic acid and fumaric acid. Commonly utilized polyhydric alchololts are ethylene glycol, propylene glycol, diethylene glycol, dipropylene glycol, butylene glycol, glycerol, trimethylolpropane, pentaerythritol and sorbitol. Preferably the polyester is prepared from a diol and a diacid. These polyesters can be modified with oils or fatty acids, i.e., alkyd resins.

The thermoplastic polymer generally has a weight average molecular weight of up to about 200,000, preferably less than about 20,000, more preferably less than about 10,000, and most preferably from about 1,000 to about 8,000 grams per mole. The thermoplastic polymer can be prepared by free radical polymerization methods or condensation polymerization methods well known to those skilled in the art.

Generally, the amount of the essentially thermoplastic polymer is effective to reduce shrinkage of the cured composition. In a preferred embodiment, the essentially thermoplastic polymer is present in the curable coating composition in an amount ranging from about 1 to about 45 percent by weight based on the total resin solids of the composition, preferably about 1 to about 35 percent by weight, and more preferably about 10 to about 30 percent by weight. When vinyl chloride polymers are present in the coating composition, the thermoplastic polymer is generally present in an amount ranging from about 1 to about 59 weight percent based upon total resin solids of the coating composition.

The coating composition also comprises ground vulcanized rubber particles or powder having an average particle size ranging from about 1 to about 300 microns. The ground vulcanized rubber with the desired particle size can be prepared by any method known to those skilled in the art for achieving such small particle sizes. For instance, U.S. Pat. No. 5,588,600 (hereby incorporated by reference) discloses a method for obtaining rubber particles from used vehicle tires wherein three comminuting steps are used. The second and third of these steps are prefaced by the use of liquid cryogenic grinding. Vulcanized rubber particles facilitate the formation of smaller particle sizes when cryogenic grinding is employed and the ground rubber behaves more like a filling extender in the uncured state. Another method for producing such particles is described in U.S. Pat. No. 5,368,240 (hereby incorporated by reference) in which scrap rubber is used to produce the rubber powder. Particularly suitable rubber particles are commercially available from Environmental Processing Systems Inc. ("EPS") of Garden City, N.Y. from their Santee River Rubber Company. Preferred ground vulcanized rubber particles are EPS-200 particles available from EPS which is a reprocessed ground rubber composed of a blend of natural and styrene-butadiene rubbers with carbon black, filler and oils.

The particle size of the rubber particles preferably is about 150 microns ('$\mu$') or less for sprayable curable compositions and less than about 300 microns for other types of curable compositions. Most preferably, the particle size range for the ground rubber is about 5 to about 300 microns. For extrudable and sprayable curable compositions, a preferred particle size range is about 74 to about 200 microns. The average particle size can be determined by the amount of ground rubber that passes through the openings of a mesh screen having a specific mesh size. The mesh size can vary, for instance, 50 U.S. mesh gives a mean particle size of 297 microns, 140 U.S. mesh gives a mean particle size of 105 microns and 325 U.S. mesh gives a mean particle size of 44 microns. Also any measuring equipment known to those skilled in the art for determining particle size distribution can be used.

The ground vulcanized rubber can include additives originally present in the vulcanized rubber that are well known in the rubber industry. For instance when the ground rubber is prepared from recycled tires, a mixture of natural and synthetic rubbers can be present along with carbon black, fillers and oil. The presence of extra additives in the ground rubber does not interfere with performance of the present invention. For instance, the components of the EPS-200 ground rubber on a weight percent basis of the reprocessed rubber are 40 to 45 percent natural rubber and styrene butadiene rubber; 27 to 33 percent carbon black; 2 to 3 percent zinc oxide; 1.5 to 2.5 percent sulfur; 1 to 2 percent stearic acid; and 10 to 20 percent process oil.

The amount of ground rubber particles present in the curable coating composition generally ranges from about 1 to about 70 weight percent of the total resin solids of the curable composition, but the preferred amount can depend upon the particular application of the curable composition. Preferably, when the coating composition is used as an adhesive, sound dampening and/or anti-flutter composition, the amount of the ground rubber particles ranges from about 5 to about 40 weight percent of the total resin solids of the curable composition. The ground rubber particles flexibilize the cured composition. The amount of rubber can be balanced with the amount of fillers to achieve the desired viscosity of the curable composition and desired stiffness of the cured composition. Examples of fillers that can be present include finely divided minerals, such as calcium carbonate, magnesium carbonate, silica, talc, mica and/or clay. One or more hollow fillers, such as glass and plastic microspheres, beads and milled or chopped glass fibers and strands also can be used as fillers. The other fillers can be present in an amount of up to around 10 weight percent of the total resin solids of the coating composition.

The curable coating composition comprises one or more contemporaneous and/or latent curing agents adapted to cure the epoxy-functional polymer(s). Useful curing agents include: aliphatic, cycloaliphatic, and aromatic polyfunctional amines such as ethylene diamine, diethylene triamine, triethylene tetraamine, tetraethylene pentamine, 1,4-diaminobutane; 1,3-diaminobutane, hexamethylene diamine, 3-(N-isopropylamino)propylamine, diaminocyclohexane, and polyoxypropylene amines; metaphenylene diamine; p,p'-methylene dianiline, and 1,4-aminonaphthalene; polyamides such as those derived from fatty acids, dimerized fatty acids or polymeric fatty acids and aliphatic polyamines; imidazoles; dicyandiamide; and boron trifluoride complexes such as boron trifluoride monoethylamine complex, boron trifluoride diethylamine complex; boron trifluoride triethylamine complex; boron trifluoride pyridine complex; boron trifluoride benzyldimethylamine complex; boron trifluoride benzylamine, boron trifluoride etherate and as are disclosed in U.S. Pat. No. 4,739,019 at column 5, lines 24–62.

The curing agent is present in the curable compositions of the present invention in an amount ranging from about 50 to about 150 percent of the stoichiometric amount for reacting with the curable epoxy-functional polymer on an equivalents basis, and preferably about 60 to about 110 percent.

In an alternative preferred embodiment, the curable coating composition can comprise one or more vinyl chloride polymers. Suitable polymers include vinyl chloride homopolymers and/or copolymers of vinyl chloride and other unsaturated compounds such as vinylidene chloride or vinyl propionate or vinyl acetate. The ratio of epoxy-functional polymer to vinyl chloride polymer, when present, can range from about 1:99 to about 99:1 on a weight percent basis of epoxy-functional polymer and vinyl chloride polymer, and preferably about 15:85 to about 85:15.

Additionally, one or more plasticizers can be included in the dispersion phase with these polymers and copolymers. Non-limiting examples of suitable plasticizers include adipates, benzoates, glutarates, isophthalates, phosphates, polyesters, sebacates and terephthalates. The amount of plasticizer can range from about 0.1 up to about 50 weight percent of the total weight of the curable coating composition. The vinyl chloride polymers produce polymeric entanglements when swelled by the plasticizer to form a fused polymeric material.

The curable compositions of the present invention can include a variety of optional ingredients and/or additives that are somewhat dependent on the particular application of the curable composition, such as pigments such as carbon black or graphite, reinforcements, thixotropes, accelerators, surfactants, plasticizers, extenders, stabilizers, corrosion inhibitors, diluents, blowing agents and antioxidants. Suitable thixotropes include fumed silica, bentonite, stearic acid-coated calcium carbonate and fatty acid/oil derivatives. Thixotropes are generally present in an amount of up to about 20 weight percent. Generally, the amount of an inorganic extender can be up to about 50 weight percent based upon the total weight of the curable composition. Optional additional ingredients such as carbon black or graphite, blowing agents, surfactants and corrosion inhibitors like barium sulfonate are generally present in an amount of less than about 5 weight percent of the total weight of the curable composition.

Diluents and plasticizers can be present in an amount of up to about 50 weight percent of the total weight of the curable composition. Examples of suitable diluents include low molecular weight (from about 100 to about 2000) aliphatic or aromatic ester compounds containing one or more ester linkages, and low molecular weight aliphatic or aromatic ethers containing one or more ether linkages and combinations thereof. Reactive diluents are designed to modify strength and/or adhesion of the cured curable composition, such as aliphatic and/or aromatic monoepoxides having a weight average molecular weight of about 300 to about 1500, can be present in the range of up to about 30 weight percent of the total weight of the curable composition.

The particular optional ingredients that are chosen in the composition and their amounts depend upon the application of the curable composition. Structural adhesives need high strength and low shrink properties. Coatings for reinforcement need an optimized strength and adequate low shrinkage properties so that the visible side of the panel does not exhibit cosmetic defects such as dimples.

Anti-flutter compositions require resilience and expansion capability, typically obtained through the use of blowing agents and/or expandable polymeric microspheres or beads, such as polypropylene or polyethylene microspheres.

The viscosities of these coating products are application-specific based on type of equipment used, required film thickness and sag resistance. Preferably, the viscosity of the coating compositions ranges from about 1000 to about 500,000 centipoise ("cp") measured at 2 RPM with a #7 spindle Brookfield measurement. Sprayable compositions preferably have viscosities below about 100,000 cp at 20 RPM reading on the Brookfield viscometer. Extrudable adhesives and anti-flutter compositions typically have viscosities of between about 100,000 and about 500,000 cp, although for anti-flutter compositions, the viscosity can range up to about 2,000,000 cp.

The curable coating compositions of the present invention can be prepared in a number of ways, including as a one-package composition with a latent curing agent or as a two-package composition. Two package curable compositions are typically prepared by combining the ingredients immediately before use. A one-package composition can be prepared in advance of use and stored.

The preparation of the curable composition can be in a manner similar to that of U.S. Pat. No. 4,739,019 at column 6, lines 2–62. All products can be made in a sigma mixer. Other mixing equipment known to those skilled in the art can be used, such as triaxial and Littleford mixers. Sound damping and other protective coatings are typically prepared as sprayable compositions. Anti-flutters and structural adhesives typically are prepared as extrudable compositions.

The compositions can be applied to the surface of a metal or polymeric substrate in a number of ways, including spraying, extrusion, or by hand with a blade. The metal substrate to be treated can be bare, oily, pretreated or prepainted prior to application of the coating. Suitable polymeric substrates include thermoplastic polymeric substrates.

The coating compositions can be cured by allowing them to stand at ambient temperature, or a combination of ambient temperature cure and baking, or by baking alone. The compositions can be cured at ambient temperature typically in a period ranging from about 24 hour to about 36 hours. If ambient temperature and baking are utilized in combination, the composition is typically allowed to stand for a period of from about 5 hours to about 24 hours followed by baking at a temperature of from about 75° C. to about 200° C., preferably from about 100° C. to about 150° C., for a period of time ranging from about 20 minutes to about 1 hour.

Also provided by the present invention is a method for preparing an adhesive bond between two surfaces to form a bonded structure. The method comprises applying to at least one of the surfaces the curable composition detailed above and then at least partially curing the curable composition to form the bonded structure. The curable compositions of the present invention are useful for adhesives and coatings for structural building components of vehicles, such as doors, frames and hoods.

The present invention will now be illustrated by the following specific, non-limiting example.

EXAMPLE

As shown in Table 1, several adhesive coating compositions were prepared and evaluated as is detailed below. The coating compositions of Table 1 were prepared by blending the ingredients (shown in Table 1) together in a one gallon sigma mixer with liquids being slowly added to powders in the mixing chamber until finished compositions were obtained. The coating compositions of Table 2 were prepared by blending the ingredients (shown in Table 2) together in pint cans with impeller blades until finished compositions were obtained. The values in brackets, [ ], indicate percentage of each component based upon total resin solids. Each composition was tested for physical properties as follows.

Lap shear bonds for testing were prepared using two strips of cold rolled steel having dimensions of 25.4 mm by 101.6 mm by 1.57 mm (1 inch by 4 inches by 0.062 inches). For each composition, a film was applied to one of the metal strips. Several glass microbeads, each having a thickness of 30 mils, were embedded in the film. A second strip of metal was placed over the top of the first strip so that only one square inch of area overlapped. Pressure was applied to the squeeze the first and second strips together such that the thickness of the coating therebetween was 30 mils, i.e., the glass microbeads acted as spacers to maintain 30 mils spacing between the metal strips and thereby maintain the desired coating thickness. The composition was cured as indicated in Table 1 or 2.

The lap shear strength of the bond in pounds per square inch (psi) was determined according to ASTM Method D-1002–65 using an INSTRON tester device. Samples were tested for both initial lap shear strength and after 250 hour salt spray exposure. Two readings were taken for each test, averaged and reported in Tables 1 and 2 below.

TABLE 1

| | Weight percent based upon total weight [based upon total weight of resin solids] | | |
|---|---|---|---|
| Component | Comparative Example 1 | Example A | Example B |
| Epoxy resin[1] | 20.8 [33.0] | 32.4 [50.5] | 42 [69.5] |
| Epoxy resin/Dimer Acid[2] | 18.4 [29.2] | 18.7 [29.2] | — |
| Glycidyl ether of alkyl phenol[3] | 4.9 [7.8] | — | — |
| Polyvinyl chloride homopolymer[4] | — | — | — |
| Diethylene glycol adipate[5] | 18.9 [30] | 13 [20.3] | 18.4 [30.5] |
| Dicyandiamide/imidazole[6] | 2.2 | 2.3 | 2.1 |
| 3-(3,4-dichlorophenyl)-1,1-dimethylurea[7] | 0.6 | 0.7 | 0.6 |
| Mica[8] | 31.9 [50.6] | — | 20.5 [33.9] |
| carbon black[9] | 0.3 | 0.3 | — |
| ground vulcanized rubber (200μ)[10] | — | 32.6 [50.9] | 15.4 [25.5] |
| ground vulcanized rubber (140μ)[11] | — | — | — |
| montmorillonite clay thixotrope[12] | 2 | — | — |
| fumed silica[13] | — | — | 1 |
| Lap Shear Strength (psi) | | | |
| Initial Value after 325° F./30 min. bake | 674 | 1603 | 1819 |
| after 400° F./60 min. bake | — | — | 1778 |
| Failure mode (% cohesive) | | | |
| Initial Value after 325° F./30 min. bake | 80 | 100 | 100 |
| after 400° F./60 min. bake | — | — | 100 |
| Lap Shear Strength after 250 hrs. salt spray (psi) | | | |
| Initial Value after 325° F./30 min. bake | 523 | 1637 | 1765 |
| after 400° F./60 min. bake | — | — | 1700 |

TABLE 1-continued

| Component | Comparative Example 1 | Example A | Example B |
|---|---|---|---|
| Failure mode (% cohesive) | | | |
| Initial Value after 325° F./30 min. bake | 50 | 90 | 90 |
| after 400° F./60 min. bake | — | — | 100 |

[1]EPON ® 828 epoxy resin which is commercially available from Shell Chemical Company.
[2]Reaction product of $C_{36}$ dimer acid with EPON ® 828 epoxy resin at 70% by weight total solids in EPON ® 828.
[3]NC513 glycidyl ether of alkyl phenol which is commercially available from Cardolite Corp.
[4]FORMOLON F-24 polyvinyl chloride homopolymer which is commercially available from Formosa Industries.
[5]Diethylene glycol adipate polyester having a $M_n$ of about 1000–2000 and an acid value less than 50.
[6]P-108 dicyandiamide/imidazole epoxy curing agent which is commercially available from Shell Chemical Company.
[7]DIURON 3-(3,4-dichlorophenyl)-1,1-dimethylurea which is commercially available from DuPont de Nemours of Wilmington, Delaware.
[8]Mica C-3000 filler which is commercially available from KMG minerals.
[9]Raven 100 carbon black which is commercially available from Colombian Chemicals Co.
[10]EPS-200 ground vulcanized rubber, 200 micron average particle size, which is commercially available from Environmental Processing Systems, Inc. of Mineola, New York.
[11]EPS-140 ground vulcanized rubber, 140 micron particle size, which is commercially available from Environmental Processing Systems, Inc.
[12]BENTONE 27 montmorillonite clay thixotrope which is commercially available from Rheox Inc.
[13]CABOSIL TS-720 fumed silica from which is commercially available Cabot Corp.

As shown in Table 1, the adhesive coating compositions of the present invention (Examples A and B) which included vulcanized ground rubber provided better lap shear strength and/or percent cohesive failure, both before and after salt spray exposure, than the coating of Comparative Example 1 which did not contain vulcanized ground rubber.

As shown in Table 2, the coating compositions of Examples C, D and E, including ground vulcanized rubber according to the present invention, had better cohesive failure and salt spray resistance than the coatings of Comparative Examples 2 and 3, respectively, which did not contain vulcanized ground rubber. Compared to Compara-

TABLE 2

| Component | Comp. Ex. 2 | Ex. C | Ex. D | Comp. Ex. 3 | Ex. E | Comp. Ex. 4 | Ex. F | Ex. G | Ex. H |
|---|---|---|---|---|---|---|---|---|---|
| Epoxy resin[1] | 30.7 [50] | 30.4 [50] | 22 [50] | 24.6 [40] | 24.3 [40] | 60.8 [99] | 60.2 [99] | 51.2 [99] | 60.2 [99] |
| Polyvinyl chloride homopolymer[4] | — | — | — | 6.1 [10] | 6.1 [10] | — | — | — | — |
| Diethylene glycol adipate[5] | 30.7 [50] | 30.4 [50] | 22 [50] | 30.7 [50] | 30.4 [50] | 0.6 [1] | 0.6 [1] | 0.5 [1] | 0.6 [1] |
| Dicyandiamide[6] | 2.2 | 2.2 | 1.6 | 2.2 | 2.2 | 2.2 | 2.2 | 1.8 | 2.2 |
| 3-(3,4-dichlorophenyl)-1,1-dimethylurea[7] | 0.6 | 0.6 | 0.6 | 0.6 | 0.6 | 0.6 | 0.6 | 0.5 | 0.6 |
| Mica[8] | 33.3 [54] | 33.0 [54] | — | 33.3 [54] | 33.0 [54] | 33.3 [54] | 33.0 [54] | — | — |
| carbon black[9] | 0.3 | 0.3 | 0.3 | 0.3 | 0.3 | 0.3 | 0.3 | 0.3 | 0.3 |
| ground vulcanized rubber (200μ)[10] | — | 1 [1] | 52.2 [70] | — | 1 [1] | — | 1 [1] | — | — |
| ground vulcanized rubber (140μ)[11] | — | — | — | — | — | — | — | 43.8 [50] | 6.2 [10] |
| montmorillonite clay thixotrope[12] | 2.1 | 2.1 | 1.5 | 2.1 | 2.1 | — | 2.1 | 1.8 | 2.1 |
| Lap Shear Strength (psi) Initial Value after 400° F./60 min. bake | 411 | 481 | 265 | 124 | 126 | 1096 | 1508 | 1071 | 1762 |
| Failure mode (% cohesive) Initial Value after 400° F./60 min. bake | 60 | 98 | 78 | 53 | 100 | 5 | 0 | 100 | 50 |
| Lap Shear Strength after 250 hrs. salt spray (psi) Initial Value after 400° F./60 min. bake | 29 | 139 | 63 | 0 | 28 | 1233 | 1328 | 864 | 1612 |
| Failure mode (% cohesive) Initial Value after 400° F./60 min. bake | 3 | 8 | 8 | 0 | 70 | 0 | 5 | 65 | 0 | footnotes see Table 1 above.

tive Example 4, coating composition Example F had better strength, coating composition Example G had better cohesive failure and Example H had better initial strength and cohesive failure.

The coating compositions of the present invention provide good corrosion protection and adhesion in a variety of applications such as protective coatings, adhesives, sound dampening compositions, reinforcement compositions, and anti-fluttering compositions.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A curable coating composition comprising:
   (a) at least one epoxy-functional polymer containing at least two epoxide groups per molecule present in an amount ranging from about 55 to about 99 weight percent of total resin solids of the coating composition;
   (b) at least one thermoplastic polymer which is substantially insoluble in the epoxy-functional polymer present in an amount ranging from about 1 to about 45 weight percent of total resin solids of the coating composition;
   (c) ground vulcanized rubber particles having an average particle size ranging from about 1 to about 300 microns present in an amount ranging from about 1 to about 70 weight percent of total resin solids of the coating composition; and
   (d) a curing agent adapted to cure the epoxy-functional polymer.

2. The coating composition according to claim 1, wherein the epoxy-functional polymer has an epoxide equivalent weight ranging from about 140 to about 600.

3. The coating composition according to claim 1, wherein the epoxy-functional polymer is the condensation reaction product of an epihalohydrin with a polyhydric alcohol.

4. The coating composition according to claim 3, wherein the epoxy-functional polymer is a polyglycidyl ether of bisphenol A.

5. The coating composition according to claim 1, wherein the thermoplastic polymer is present as a blended ingredient and does not react chemically with other components of the coating composition.

6. The coating composition according to claim 5, wherein the thermoplastic polymer does not react chemically with the epoxide groups of the epoxy-functional polymer.

7. The coating composition according to claim 1, wherein the thermoplastic polymer has a weight average molecular weight of less than about 200,000 grams per mole.

8. The coating composition according to claim 7, wherein the thermoplastic polymer has a weight average molecular weight ranging from about 1,000 to about 8,000 grams per mole.

9. The coating composition according to claim 1, wherein the thermoplastic polymer is a polyester having a weight average molecular weight of less than about 10,000 grams per mole.

10. The coating composition according to claim 1, wherein the thermoplastic polymer is present in an amount ranging from about 1 to about 30 weight percent of total resin solids of the coating composition.

11. The coating composition according to claim 1, wherein the curing agent is present in an amount ranging from about 50 to about 150 percent of the stoichiometric amount for reacting with the epoxy-functional polymer on an equivalents basis.

12. The coating composition according to claim 1, further comprising mineral fillers.

13. The coating composition according to claim 1, further comprising an expandable material selected from the group consisting of blowing agents, polymeric microspheres and combinations thereof.

* * * * *